United States Patent
Caubel et al.

(10) Patent No.: US 9,983,579 B2
(45) Date of Patent: May 29, 2018

(54) DRONE HAVING A SUPPORT HOUSING AN ANTENNA

(71) Applicant: PARROT DRONES, Paris (FR)

(72) Inventors: Christine Caubel, Paris (FR); Guillame Savoye, Paris (FR); Flavien Morra, Pantin (FR); Arsene Ferrand, Paris (FR)

(73) Assignee: PARROT DRONES, Paris (FR)

( * ) Notice: Subject to any disclaimer, the term of this patent is extended or adjusted under 35 U.S.C. 154(b) by 0 days. days.

(21) Appl. No.: 15/298,089

(22) Filed: Oct. 19, 2016

(65) Prior Publication Data

US 2017/0115660 A1    Apr. 27, 2017

(30) Foreign Application Priority Data

Oct. 23, 2015 (FR) .................... 15 60124

(51) Int. Cl.
| | |
|---|---|
| G05D 1/00 | (2006.01) |
| B64D 47/08 | (2006.01) |
| H01Q 1/22 | (2006.01) |
| H01Q 1/28 | (2006.01) |
| H04W 4/00 | (2018.01) |

(52) U.S. Cl.
CPC .......... *G05D 1/0022* (2013.01); *B64D 47/08* (2013.01); *G05D 1/0016* (2013.01); *H01Q 1/2291* (2013.01); *H01Q 1/28* (2013.01); *B64C 2201/108* (2013.01); *B64C 2201/146* (2013.01); *H04W 4/008* (2013.01)

(58) Field of Classification Search
CPC .... G05D 1/0022; G05D 1/0016; B64D 47/08; B64C 2201/108; B64C 2201/146; H04W 4/008
USPC .......................... 701/2, 36, 13, 3; 244/175 R
See application file for complete search history.

(56) References Cited

FOREIGN PATENT DOCUMENTS

| GB | 1 523 714 A | 9/1978 |
|---|---|---|
| WO | 2011058255 A1 | 5/2011 |

OTHER PUBLICATIONS

Attached please find the Written Opinion for the FR1560124 application.

*Primary Examiner* — Gertrude Arthur Jeanglaude
(74) *Attorney, Agent, or Firm* — Haverstock & Owens LLP

(57) ABSTRACT

The invention relates to a rotary-wing drone (10) comprising a drone body comprising an electronic board controlling the piloting of the drone, a wireless communication module and a plurality of connection arms, the wireless communication module being connected to a communication antenna (46), a plurality of propulsion units (36) mounted at the end of respective connection arms (34), and at least one drone body support (38) adapted to maintain the drone body remote from the ground. The drone body support (38) comprises an antenna housing (44) for holding the communication antenna.

8 Claims, 2 Drawing Sheets

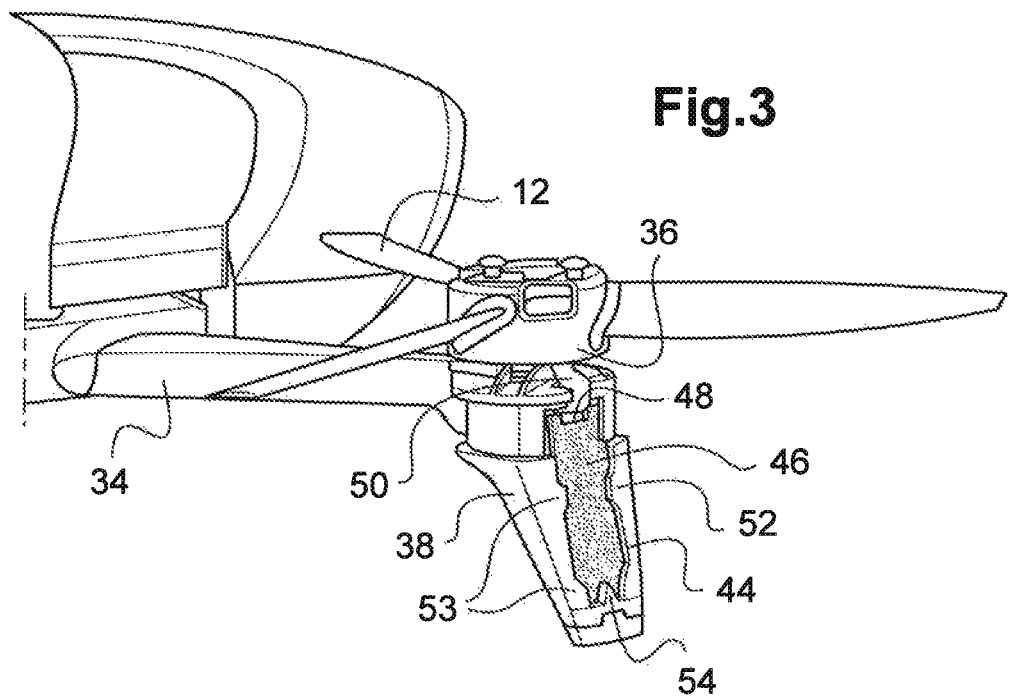
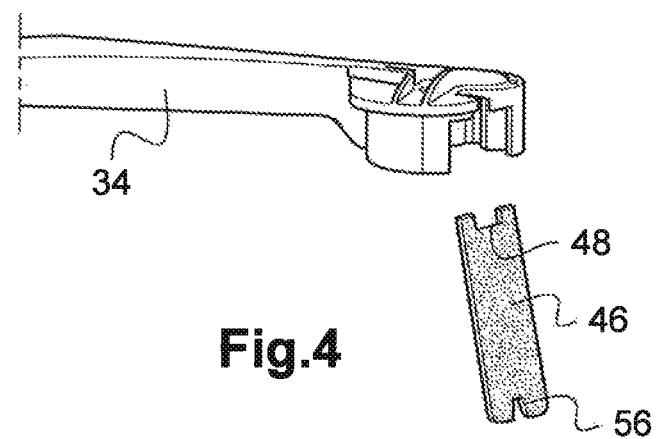
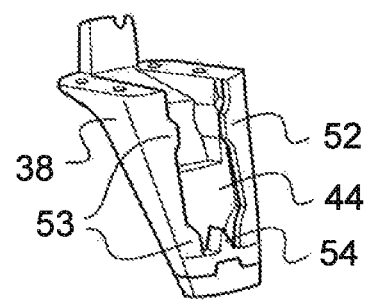

DRONE HAVING A SUPPORT HOUSING AN ANTENNA

The invention relates to the motorized flying machines such as drones, in particular the rotary-wing drones of the quadricopter type.

The AR.Drone 2.0 or the Bebop Drone of Parrot SA, Paris, France, are typical examples of such quadricopters. They are equipped with a series of sensors (accelerometers, 3-axis gyrometers, altimeter) and may include at least one camera. These drones are provided with several rotors driven by respective motors, adapted to be controlled in a differentiated manner so as to pilot the drone in attitude and speed. These drones may comprise a front video camera capturing an image of the scene towards which the drone is directed.

The front video camera can be used for an "immersive mode" piloting of the drone, i.e. where the operator uses the image of the camera in the same way as if he were himself on board the drone. It may also serve to capture sequences of images of a scene towards which the drone is directed, the operator using the drone in the same way as a camera that, instead of being held in hand, would be borne by the drone. The images collected can be recorded, put online on web sites, sent to other Internet users, shared on social networks, etc.

The WO 2010/061099 A2, EP 2 364 757 A1 and EP 2 450 862 A1 (Parrot) describe the principle of piloting a drone through a touch-screen multimedia telephone or tablet having an integrated accelerometer, for example a smartphone of the iPhone type or a tablet of the iPad type (registered trademarks).

In the following of the description, the term "tablet" will generally be used to denote this apparatus, but this term must not be understood in its narrow meaning; on the contrary, it also includes the functionally equivalent devices, in particular all the portable devices provided with at least one visualization screen and with wireless data exchange means, such as smartphone, multimedia player not provided with phone functions, game console, etc.

The tablet incorporates the various control elements required for the detection of the piloting commands and the bidirectional exchange of data via a radio link of the W-Fi (IEEE 802.11) or Bluetooth wireless local network type, established directly with the drone. Its touch screen displays the image captured by the front camera of the drone, with, in superimposition, a certain number of symbols allowing the control of the flight and the activation of commands by simple contact of the operator's finger on this touch screen.

The bidirectional wireless radio link comprises an uplink (from the tablet to the drone) and a downlink (from the drone to the tablet) to transmit data frames containing:

(from the tablet to the drone) the piloting commands, hereinafter simply denoted "commands", sent at regular intervals and on a systematic basis;

(from the drone to the tablet) the video stream coming from the camera; and (from the drone to the tablet) as needed, flight data established by the drone or state indicators such as: battery level, phase of flight (take-off, automatic stabilization, landed on the ground, etc.), altitude, detected fault, etc.

To allow such a communication, the drone comprises a communication means connected to an antenna so as to allow a communication with the piloting device.

The antenna is for example a W-Fi antenna.

However, so that the antenna allowing a communication between the drone and the control device is efficient and that the performances are maximized, it is necessary that the antenna is arranged almost vertically, far from the metal elements present in the drone body and the battery.

For that purpose, it is known to position the antenna at one of the drone support feet and to fasten it by means of an adhesive.

This antenna fastening means suffers from drawbacks. In particular, in case of shock on the drone legs, the antenna may be easily detached or even be damaged and it is not provided that this antenna can be easily replaced. The object of the invention is to remedy these various drawbacks, by proposing a drone in which the antenna is installed so as to be mechanically robust to shocks. Furthermore, this integration is light weight, so as to be able to keep, or even to improve, the drone autonomy. Moreover, it allows an easy replacement of the antenna in case of failure.

For that purpose, the invention proposes a rotary-wing drone comprising a drone body comprising an electronic board controlling the piloting of the drone, wireless communication means and a plurality of connection arms, said wireless communication means being connected to a communication antenna, a plurality of propulsion units mounted at the end of respective connection arms, and at least one support of the drone body adapted to maintain the drone body remote from the ground.

Characteristically, the drone body support comprises an antenna housing provided with means for holding the communication antenna.

According to various subsidiary characteristics:

the holding means are slide connection means into which the antenna is slid by translation.

the drone body support is fastened to the connection arm and is in a direction turned towards the ground.

the drone body support is fastened at the end of the connection arm, under the propulsion unit.

the antenna is slid into the drone body support, substantially perpendicularly to the drone body.

the antenna housing comprises a foolproofing means of a given shape, the antenna having a foolproofing means of complementary shape.

the foolproofing means is positioned in the antenna housing at the opposite of the propulsion unit.

the drone body support comprises connection means adapted to connect the antenna, the antenna being provided with complementary connection means.

the drone body support is removable, allowing the insertion of the antenna into said antenna housing.

An exemplary embodiment of the present invention will now be described, with reference to the appended drawings, in which the same references denote identical or functionally similar elements throughout the figures.

FIG. 3 is a partial, enlarged view of the region of the drone showing the drone body support integrating an antenna according to the invention.

FIG. 4 is an exploded view of the end of the connection arm and of the drone body support according to the invention.

Exemplary embodiment and implementation of the invention will now be described.

Figure 1:
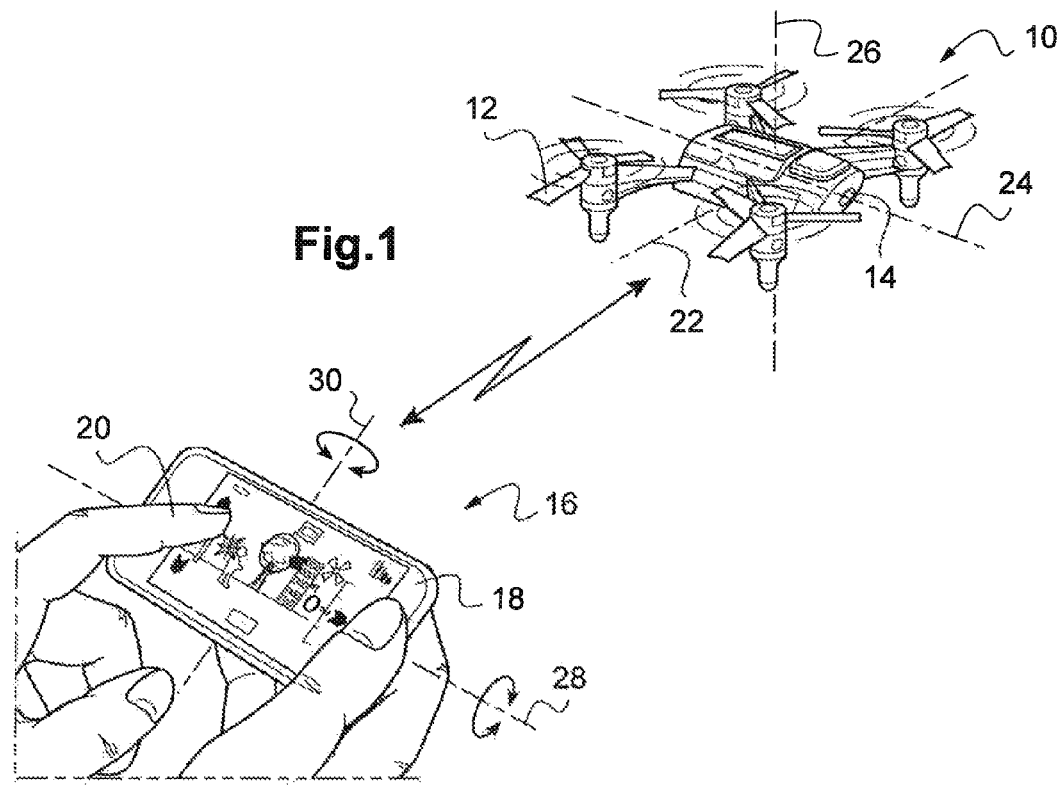
FIG. 1 is an overall view showing the drone and the associated remote-control apparatus allowing the remote piloting thereof.

In FIG. 1, the reference 10 generally denotes a drone, which is for example a quadricopter, such as the Bebop Drone of Parrot SA, Paris, France. This drone includes four coplanar rotors 12 whose motors are piloted independently from each other by an integrated system of navigation and control of attitude. It is provided with a front-view camera 14 making it possible to obtain an image of the scene towards which the drone is directed.

The drone also includes a vertical-view camera (not shown) pointing downward, adapted to capture successive images of the overflown land and used in particular to evaluate the speed of the drone with respect to the ground. Inertial sensors (accelerometers and gyrometers) allow measuring with a certain accuracy the angular speeds and the attitude angles of the drone, i.e. the Euler angles (pitch φ, roll θ and yaw ψ) describing the inclination of the drone with respect to a horizontal plane of a fixed terrestrial reference system. An ultrasound telemeter arranged under the drone moreover provides a measurement of the altitude with respect to the ground.

The drone 10 is piloted by a remote-control apparatus 16 provided with a touch screen 18 displaying the image captured by the front camera 14 with, in superimposition, a certain number of symbols allowing the activation of piloting commands by simple contact of the finger 20 of a user on the touch screen 18. The apparatus 16 is provided with radio link means for connection to the drone, for example of the Wi-Fi (IEEE 802.11) local network type, for the bidirectional exchange of data from the drone 10 to the apparatus 16, in particular for the transmission of the image captured by the camera 14, and from the apparatus 16 to the drone 10 for the sending of piloting commands.

Figure 2:
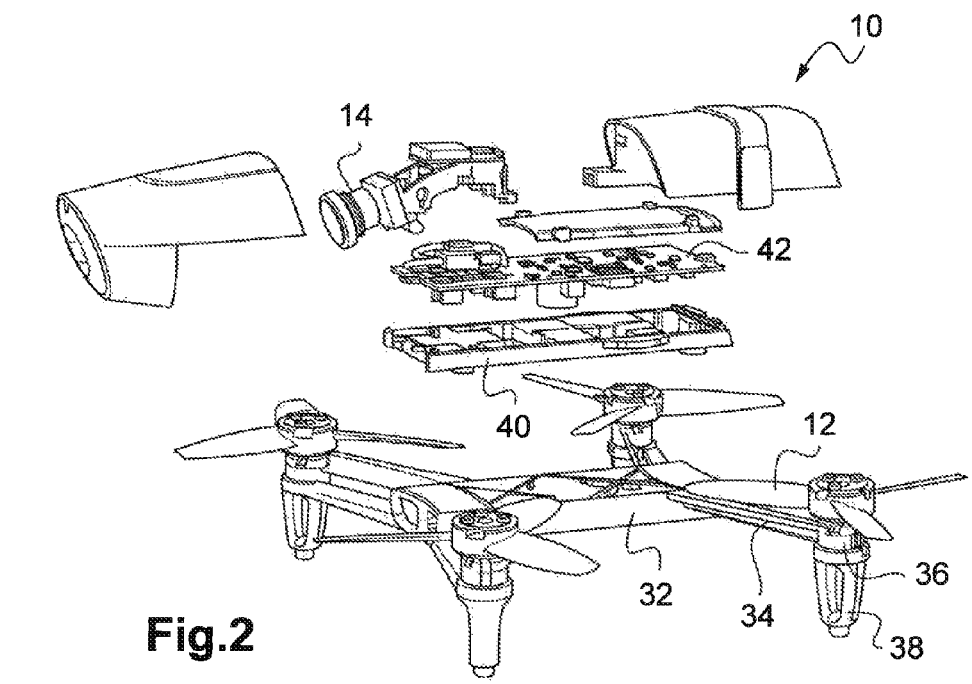
FIG. 2 is an exploded perspective view of a drone showing, dissociated from each other, the different internal elements thereof.

In FIG. 2, the drone 10 is shown with a drone body 10 comprising, in lower part, a frame 32 integral with four link arms 34 radiating from the frame. Each arm is equipped at its distal end with a propulsion unit 36 comprising a motor driving a propeller 12 into rotation. In lower part, the propulsion unit 36 is extended by a drone body support 38 forming a foot on which the drone can rest on the ground when stopped.

According to another embodiment, the drone body support(s) 38 are fastened to the frame 32 of the drone body 10.

According to still another embodiment, the drone body support(s) 38 are fastened to the connection arms 34.

The drone body comprises a plate 40 intended to receive the electronic board 42 carrying the almost-totality of the electronic components of the drone, including the inertial unit of the latter, and to receive wireless communication means. The plate 40 is in the form of a single-part element made of a light-weight metal material and serves as a cooler for evacuating the calories in excess of some components generating high quantities of heat, such as the main processor, the radio chip, the motor switching MOSFETs, etc.

According to the invention, at least one drone body support 38 comprises an antenna housing 44, the antenna 46 being connected to the wireless communication means of the electronic board 42, in particular via a connection cable. Furthermore, the antenna housing 44 is provided with means for holding the communication antenna so as to firmly hold the antenna on the drone body support 38.

FIG. 3 is an enlarged view of a propulsion unit 36 and of the drone body support 38, these latter being mounted at the end of a connection arm 34. A drone body support 38 is shown, which integrates a communication antenna 46 in its antenna housing 44, this sub-unit being fastened to the connection arm 34 under the propulsion unit 36. The communication antenna 46 comprises a notch 48 positioned under the propulsion unit 36 so as to allow the passage of the cable 50 of the motor of the propulsion unit 36. That way, the bulk linked to the integration in the drone body support 38 is optimized.

As illustrated in FIG. 3, the communication antenna holding means are slide connection means 52 into which the antenna 46 is slid by translation. A slide connection ensures a single axis of freedom, i.e. the translational movement in the direction of the slide connection.

According to the embodiment illustrated in FIG. 3 and in FIG. 4, the slide connection means 48 are consisted of stop areas 53 allowing the making of the slide. According to the illustrated example, four stop areas 53 are shown, however, the slide connection means 46 may be made by means of at least two stop areas 53.

However, other holding means may be used in order to firmly lock the antenna in the antenna housing 44.

The drone body support 38 is fastened to the connection arm and is in a direction turned, substantially vertically, towards the ground.

According to a particular embodiment, the drone body support 38 is positioned substantially perpendicularly to the connection arm 34.

According to another particular embodiment, the drone body support 38 is positioned according to an angle of 60° to 90° with respect to the direction of the connection arm 34.

The communication antenna 46 is slid into the drone body support 38 essentially perpendicularly to the drone body. Indeed, in order to optimize the antenna radiation formed of lobes, it is advantageous to position the communication antenna substantially perpendicularly, in particular so as to form an angle of 70° to 90° with respect to the connection arm 34.

The antenna housing 44 comprises a foolproofing means 54 of a given shape, the antenna having a foolproofing means 56 of complementary shape. The foolproofing means is an element, for example a protrusion, making it possible to avoid errors of assembly during the mounting.

As illustrated in FIGS. 3 and 4, the foolproofing means is positioned in the antenna housing 44 at the opposite of the propulsion unit 36.

FIG. 4 is an exploded view of a connection arm 34, of a drone body support 38 and an antenna 46 so as to illustrate the method of assembly of the antenna 46 to the drone.

In particular, in order to allow the replacement of the communication antenna 46, the drone body support 38 is a removable element comprising the antenna housing 44 and the slide connection means 52. The removable drone body support 38 allows making the communication antenna 46 slide in the antenna housing 44, then an assembly of the drone body support containing the antenna to the connection arm 34, as illustrated. Once assembled, the connection arm closes the antenna housing so as to firmly fasten the communication antenna 46 in the housing 44 of the drone body support.

The drone body support 38 comprises connection means adapted to connect the antenna and the antenna is provided with complementary connection means.

These connection means allow an easy exchange of the antenna in case of failure of the latter.

As an alternative, the connection cable of the wireless communication means is welded to the antenna 46.

According to the invention, the antenna is integrated in the rigid structure of the drone body support, the latter protecting the antenna in case of shock.

The invention claimed is:

1. A rotary-wing drone comprising
a drone body comprising an electronic board controlling the piloting of the drone, wireless communication means and a plurality of connection arms,
said wireless communication means being connected to a communication antenna,
a plurality of propulsion units mounted at the end of the respective connection arms,
at least one drone body support adapted to maintain the drone body remote from the ground, wherein the drone body support is coupled to the plurality of connection arms and is in a direction turned towards ground,
wherein the drone body support comprises an antenna housing for holding the communication antenna.

2. The drone according to claim 1, wherein the antenna housing holds the communication antenna by a slide connection into which the communication antenna is slid by translation.

3. The drone according to claim 1, wherein the drone body support is fastened at an end of the plurality of connection arms, under the propulsion unit.

4. The drone according to claim 1, wherein the antenna is coupled to the support of the drone body, substantially perpendicular to the drone body.

5. The drone according to claim 1, wherein the antenna housing comprises a foolproofing means of a given shape, the antenna having a foolproofing means of complementary shape.

6. The drone according to claim 5, wherein the foolproofing means is positioned in the antenna housing at the opposite of the propulsion unit.

7. The drone according to claim 1, wherein the drone body support comprises connection means adapted to connect the antenna, the antenna being provided with complementary connection means.

8. The drone according to claim 1, wherein the drone body support is removable, allowing the insertion of the antenna into said antenna housing.

* * * * *